US009162900B2

(12) United States Patent
Kahn et al.

(10) Patent No.: US 9,162,900 B2
(45) Date of Patent: Oct. 20, 2015

(54) METHOD FOR PREPARING A WATER-COMPATIBLE COMPOSITION OF METAL OXIDE NANOCRYSTALS AND THE WATER-COMPATIBLE COMPOSITION OBTAINED

(75) Inventors: Myrtil Kahn, Toulouse (FR); Fabienne Gauffre Guirardel, Ramonville Saint-Agne (FR); Javier Rubio-Garcia, Piedras Blancas-Asturias (ES); Christophe Mingotaud, Toulouse (FR); Bruno Chaudret, Vigoulet-Auzil (FR)

(73) Assignee: CENTRE NATIONAL DE LA RECHERCHE SCIENTIFIQUE (C.N.R.S.), Paris (FR)

(*) Notice: Subject to any disclaimer, the term of this patent is extended or adjusted under 35 U.S.C. 154(b) by 794 days.

(21) Appl. No.: 13/376,222

(22) PCT Filed: Jun. 4, 2010

(86) PCT No.: PCT/FR2010/051103
§ 371 (c)(1),
(2), (4) Date: Mar. 14, 2012

(87) PCT Pub. No.: WO2010/139910
PCT Pub. Date: Dec. 9, 2010

(65) Prior Publication Data
US 2012/0161076 A1 Jun. 28, 2012

(30) Foreign Application Priority Data
Jun. 5, 2009 (FR) ..................................... 09 02736

(51) Int. Cl.
| C01G 1/02 | (2006.01) |
| C08K 3/22 | (2006.01) |
| C08K 13/02 | (2006.01) |
| C08K 13/04 | (2006.01) |
| C08L 71/02 | (2006.01) |
| B82Y 30/00 | (2011.01) |
| C01G 9/02 | (2006.01) |
| C01G 11/00 | (2006.01) |
| C01G 15/00 | (2006.01) |
| C01G 17/02 | (2006.01) |
| C01G 19/02 | (2006.01) |
| C01G 23/04 | (2006.01) |
| C01G 25/02 | (2006.01) |
| C01G 27/02 | (2006.01) |
| C01G 29/00 | (2006.01) |
| C01G 49/02 | (2006.01) |
| C01G 51/04 | (2006.01) |

(52) U.S. Cl.
CPC . *C01G 1/02* (2013.01); *B82Y 30/00* (2013.01); *C01G 9/02* (2013.01); *C01G 11/00* (2013.01); *C01G 15/00* (2013.01); *C01G 17/02* (2013.01); *C01G 19/02* (2013.01); *C01G 23/04* (2013.01); *C01G 25/02* (2013.01); *C01G 27/02* (2013.01); *C01G 29/00* (2013.01); *C01G 49/02* (2013.01); *C01G 51/04* (2013.01); *C08K 3/22* (2013.01); *C08K 13/02* (2013.01); *C08K 13/04* (2013.01); *C08L 71/02* (2013.01); *C01P 2002/84* (2013.01); *C01P 2004/04* (2013.01); *C01P 2004/32* (2013.01); *C01P 2004/39* (2013.01); *C01P 2004/64* (2013.01); *C01P 2006/60* (2013.01); *Y10T 428/2982* (2015.01)

(58) Field of Classification Search
CPC ............ B82Y 30/00; C01G 1/02; C08K 3/22; C08K 13/02; C08K 13/04; C08L 71/02
USPC .............. 516/77, 88, 100; 977/773, 774, 775, 977/777, 811
See application file for complete search history.

(56) References Cited

U.S. PATENT DOCUMENTS

| 7,704,413 B2 | 4/2010 | Kahn |
| 2008/0134836 A1 | 6/2008 | Brooks |

FOREIGN PATENT DOCUMENTS

| EP | 1 775 575 | 4/2007 |
| FR | 2 853 307 | 10/2004 |
| WO | 03/014011 | 2/2003 |
| WO | 2004/092069 | 10/2004 |

OTHER PUBLICATIONS

Susumu, K., et al.; Journal of the American Chemical Society, 2007, vol. 129, p. 13987-13996.*
International Search Report dated Sep. 1, 2010, corresponding to PCT/FR2010/051103.
William W. Yu et al.; "Forming Biocompatible and Nonaggregated Nanocrystals in Water Using Amphiphilic Polymers"; J.Am. Chem. Soc.; vol. 129; Feb. 20, 2007; pp. 2871-2879.
Juliane Keilitz et al.; "Dendritic Polymers with a Core-Multishell Architecture: A Versatile Tool for the Stabilization of Nanoparticles"; Chemistry of Materials, American Chemical Society; Apr. 8, 2008; vol. 20, No. 7.
Rui Hong, et al.; "Surface PEGylation and Ligand Exchange Chemistry of FePT Nanoparticles for Biological Applications"; Chem. Mater; vol. 17; Aug. 5, 2005; pp. 4617-4621.

* cited by examiner

Primary Examiner — Robert Jones, Jr.
(74) Attorney, Agent, or Firm — Young & Thompson (57) ABSTRACT

A method for preparing a composition of metal oxide nanocrystals from at least one organometallic precursor in an aprotic solvent in the presence of at least one PEG ligand including a carbon chain having at least one end functionalized by a coordinating group containing at least one heteroatom, and at least one [—OCH$_2$CH$_2$]$_n$ group, such that it is soluble in both the aprotic solvent medium and in water. The resulting water-compatible and organocompatible composition of metal oxide nanocrystals is also described.

10 Claims, 8 Drawing Sheets

METHOD FOR PREPARING A WATER-COMPATIBLE COMPOSITION OF METAL OXIDE NANOCRYSTALS AND THE WATER-COMPATIBLE COMPOSITION OBTAINED

BACKGROUND OF THE INVENTION

1. Field of the Invention

The invention relates to a method for the preparation of a composition of nanoparticles, called metal oxide nanocrystals, of at least one metal oxide in the crystalline state, from at least one organometallic precursor in an aprotic solvent medium and in the presence of at least one ligand chosen from the group of organic compounds which have at least one carbon chain and are soluble in said aprotic solvent medium. It also relates to a composition of nanoparticles, called metal oxide nanocrystals, obtained in this way.

2. Description of the Related Art

Throughout the text, the following terminology is adopted:
nanoparticle: any particle of whatever shape having at least a width and thickness which are both less than 100 nm, typically of between 1 nm and 20 nm;
metal oxide nanocrystals: nanoparticles made up of at least one compound chosen from metal oxides in the crystalline state, each nanoparticle having the structure of the metal oxide(s), that is to say being formed from atoms of metal(s) and oxygen bonded to one another as in bulk metal oxides;
organometallic precursor: any coordination molecule or compound containing at least one organic group bonded to at least one metal atom (transition metal or compound of the main groups, that is to say, in particular, zinc, cadmium, boron, aluminum, gallium, indium, thallium, germanium, tin, titanium, zirconium, hafnium, the lanthanides (Ce, Pr, Nd, Sm, Eu, Gd, Tb, Dy, Ho, Er, Tm, Yb, Lu), scandium, yttrium, silicon, bismuth and the other transition metals) by a carbon atom or a hetero atom (chosen in particular from N, P, As, Si, S, Se, Te) of this organic group;
organometallic precursor which is spontaneously reactive to oxidation: organometallic precursor which is converted in an exothermic manner into an oxide in which the metal atom has a degree of oxidation greater than or equal to 1 when placed in the presence of at least one oxidizing agent (such as water, oxygen, ambient air . . . );
oxidizing agent: any agent allowing the conversion of an organometallic precursor into an oxide;
carbon chain: any aliphatic chain, saturated or unsaturated, straight or branched, substituted or unsubstituted, which may contain hetero atoms;
aprotic solvent medium: any composition which is not protogenic, does not have a hydrogen atom capable of forming hydrogen bonds, and in which water which may be present in traces does not act as a solvent agent; such a composition is capable of forming a liquid solution when brought into contact with at least one compound such as an organometallic precursor; it can be in the initially liquid state or, on the other hand, can pass into the liquid state only after contact with the compound(s) to be solubilized; it can be simple, that is to say formed by a single compound, or on the other hand complex and comprise several compounds; in particular, it can comprise not only one or more compound(s) which act as the solvent agent, but also any other compound which is not consumed by the formation reaction of metal nanocrystals—in particular in an oxidation reaction—is substantially neutral with respect to the dissolution of the organometallic precursor(s), and possibly plays a role in the formation reaction of metal nanocrystals—in particular in an oxidation reaction; such an aprotic solvent medium is, in particular, non-aqueous;
colloidal solution: any clear liquid composition of solid nanoparticles dispersed in a liquid; a liquid colloidal solution has several but not all of the properties of a true liquid solution, the nanoparticles remaining in the solid state; colloidal suspension or dispersion is also sometimes referred to;
water-compatible composition of nanoparticles: any composition of nanoparticles which can be dispersed at least in an aqueous medium, in particular any composition which can form a colloidal solution (liquid dispersion) in an aqueous medium;
organocompatible composition of nanoparticles: any composition of nanoparticles which can be dispersed in at least an organic—in particular non-aqueous—protic or aprotic medium, in particular any composition which can form a colloidal solution (liquid dispersion) with at least such an organic—in particular non-aqueous—protic or aprotic liquid medium;
coordinating group: any chemical group which can form a covalent, dative, hydrogen or electrostatic bond with metal atoms, metal ions, oxygen and metal oxides.

WO 2004/092069 describes a method for the preparation of nanoparticles of at least one crystalline metal oxide, in which at least one organometallic precursor which is spontaneously reactive to oxidation is chosen, a liquid solution of each organometallic precursor in a non-aqueous solvent medium in the presence of at least one ligand which is soluble in said solvent medium is prepared, and this liquid solution is brought into contact with at least one oxidizing agent under reaction condition suitable for resulting directly in the production of metal oxide nanocrystals.

This method is satisfactory and enables the shape and size of the nanoparticles and their properties to be controlled. In addition, the thesis of Carole Pagès, University of Toulouse III-Paul Sabatier UFRPCA Laboratory of Coordination Chemistry, Dec. 17, 2007 pages 120 to 149 demonstrates in particular that the ligands which must be used for the preparation of such nanoparticles must necessarily have an aliphatic alkyl chain. Thus, it was not possible to obtain any composition of metal oxide nanocrystals by such a method in simple solution in an aprotic solvent medium in the presence of a ligand which does not have such an aliphatic alkyl chain.

This known method can be applied to any metal compound for which there is an organometallic precursor which is spontaneously reactive to oxidation and which can be solubilized in an aprotic solvent medium, or to any combination of such metal compounds. Among these metal compounds, there may thus be mentioned: zinc, cadmium, boron, aluminum, gallium, indium, thallium, germanium, tin, titanium, zirconium, hafnium, the lanthanides (Ce, Pr, Nd, Sm, Eu, Gd, Tb, Dy, Ho, Er, Tm, Yb, Lu), scandium, yttrium, silicon, bismuth and the other transition metals.

All these known methods for the synthesis of metal oxide nanocrystals from organometallic precursors in an aprotic solvent medium have the disadvantage of producing compositions of nanocrystals of metal oxides which are organocompatible, but which on the other hand are not water-compatible.

In this respect, it is to be noted that although the presence of traces of water in the solvent medium are known to be able to play a role in the context of the oxidation reaction (cf. "Size- and Shape-Control of Crystalline Zinc Oxide Nanoparticles:

A New Organometallic Synthetic Method", Myrtil L. Kahn et al., Adv. Func. Mater. 2005, 15, no. 3, March), the presence of a significant and uncontrolled amount of water is strictly incompatible with the control of an organometallic decomposition reaction. Indeed, in the organometallic technical field, water is systematically considered to be detrimental, and even dangerous. More particularly, in the case of an oxidation reaction starting from an organometallic precursor, it is considered that the presence of a significant and uncontrolled amount of water in the medium would necessarily have the consequence at the very least of considerably disturbing and even preventing the functioning of the reaction. Indeed, it is known that any uncontrolled presence of water unavoidably leads to the formation of metal hydroxides (destructive and exothermic decompositions of the Zerewitinoff type) and is destructive and detrimental in the context of the preparation and use of organometallic compounds. Needless to say, reactions in the presence of organometallics are most often carried out in the presence of a water trap in order to work in a dry atmosphere.

This is all the more true in the case of an oxidation reaction such as is mentioned in WO2004/092069, in which a significant and uncontrolled amount of water would additionally necessarily lead to a disturbance in the functioning of the oxidation reaction itself. It is thus out of the question to carry out this type of reaction in the presence of an uncontrolled amount of water, or even in the presence of a hydrophilic compound which is capable of introducing a significant and uncontrolled amount of water into the reaction medium.

It would therefore be useful to enable such compositions of metal oxide nanocrystals which are water-compatible, and more particularly both organocompatible and water-compatible, that is to say which can be dispersed both, and as required, in aprotic—in particular organic non-aqueous—media and in protic media—in particular water and aqueous media—to be obtained. In particular it is important to obtain such water-compatible compositions to enable them to be used in numerous applications, in particular in physiological media, for therapeutic use or for medical imaging, and in all applications for which the aim is to avoid the use of organic solvents which are toxic and/or polluting volatile organic compounds (VOC), the use of which must be limited and even suppressed taking account environmental awareness regulations.

Various methods have already been proposed to enable compositions of nanocrystals of metal oxides which are initially not water-compatible to be rendered water-compatible.

A first approach could consist of exchanging the hydrophobic ligands for ligands which are analogous but have hydrophilic groups, such as polymers derived from PEG (thiol-PEG, amino-PEG, carboxy-PEG). However, this approach would necessitate a relatively complex second stage, the yield of which is not very good. In addition, it would not result in metal oxide nanocrystals doped exclusively with hydrophilic ligands, the exchange reaction never being total.

A second approach consists of incorporating into the composition obtained amphiphilic ligands which are capable of interacting with the hydrophobic ligands resulting from the preparation of the nanoparticles, without replacing these hydrophobic ligands, forming bilayer structures around the nanoparticles. The compositions obtained with this approach may have a certain toxicity (due to the release of amphiphilic compounds) and a poorly controlled stability, which is a disadvantage in particular in biological and therapeutic applications.

In certain very specific cases, another approach can consist of choosing, for carrying out the preparation of the nanoparticles, a ligand having, at one of the ends of the aliphatic alkyl chain a group which subsequently enables chemical reactions for grafting of a hydrophilic group to be carried out. But, there again, an additional stage is necessary, and this approach is only possible in very particular cases which are of little use in practice.

In addition, these various approaches also most often have the disadvantage that the compositions of nanoparticles which have been modified to be water-compatible subsequently are no longer organocompatible under satisfactory conditions.

SUMMARY OF THE INVENTION

The object of the invention is thus to mitigate these disadvantages and to propose a method which enables a composition of metal oxide nanocrystals which is water-compatible to be obtained directly in a single stage by a synthesis method in an aprotic solvent medium, which to date was considered to be absolutely impossible. More particularly, the object of the invention is to propose such a method which enables such a composition which is both water-compatible and organocompatible to be obtained.

More particularly, the object of the invention is to propose a method which enables a composition of metal oxide nanocrystals in the form of a colloidal solution regardless of the solvent medium, organic or aqueous, and of which the properties (in particular the photoluminescence properties) remain unchanged in an aqueous medium, to be obtained.

The object is also to propose such a method which is simple, rapid and easy to control, in particular which can be carried out directly in a single stage by synthesis in an aprotic solvent medium, and which can be subjected to easy adjustments to obtain desired characteristics of the nanocrystals, in particular with respect to their shapes and dimensions. More particularly, the object of the invention is to propose such a method which enables liquid compositions of metal oxide nanocrystals perfectly dispersed (non-agglomerated) in a solvent medium, which can be organic or aqueous, to be obtained, these metal oxide nanocrystals having shapes and dimensions which can be controlled with precision and which are at least substantially uniform, that is to say according to a unimodal distribution, in particular substantially homogeneous (low dispersion), and can even be monodisperse. The object of the invention is also to propose a method which enables colloidal solutions of metal oxide nanocrystals both in an organic solvent medium and in an aqueous solvent medium to be obtained.

The object of the invention is also to propose such a preparation method which is simple, carried out in a single stage without a complex apparatus, is free from heat treatment, does not produce significant amounts of polluting by-products and is compatible with an exploitation on an industrial scale under satisfactory economic conditions.

The object of the invention is also to propose a composition as mentioned above.

The object of the invention is also to propose such a method and such a composition which is applicable to a wide variety of metals.

To this extent, the invention relates to a method for the preparation of a composition of nanoparticles, called metal oxide nanocrystals, of at least one metal oxide in the crystalline state from at least one organometallic precursor, in which:

a liquid solution of at least one organometallic precursor which is spontaneously reactive to oxidation, in an aprotic solvent medium in the presence of at least one organic ligand which has at least one carbon chain, at least one end of which is functionalized by a coordinating group containing at least one hetero atom, and is soluble in said aprotic solvent medium, is prepared, this liquid solution is brought into contact with at least one oxidizing agent—in particular an oxidizing gas, such as water vapor, or liquid water—under reaction conditions which are suitable for directly causing the formation of metal oxide nanocrystals, wherein the following are chosen:

at least one ligand, called PEG ligand, from the group of organic compounds which contain at least one carbon chain having at least one [—$OCH_2CH_2$]$_n$ group, n being an integer greater than or equal to 1, and are soluble in water, said aprotic solvent medium such that each PEG ligand is soluble in this aprotic solvent medium, and such that a water-compatible and organocompatible composition of metal oxide nanocrystals is obtained directly in one stage.

The invention thus generally consists in a method for the preparation of metal nanocrystals from at least one organometallic precursor, in which:

a liquid solution of at least one organometallic precursor in an aprotic solvent medium in the presence of at least one compound, called organic ligand, which has at least one carbon chain, at least one end of which is functionalized by a coordinating group containing at least one hetero atom, and is soluble in said aprotic solvent medium is prepared, this liquid solution is brought into contact with at least one reagent under reaction conditions which are suitable for directly causing the formation of metal nanocrystals (in one stage and by decomposition of each organometallic precursor), wherein the following are chosen:

at least one ligand, called PEG ligand, from the group of organic ligands which contain at least one carbon chain having at least one [—$OCH_2CH_2$]$_n$ group, n being an integer greater than or equal to 1, and are soluble in water, said aprotic solvent medium such that each PEG ligand is soluble in this aprotic solvent medium, and such that a water-compatible and organocompatible composition of metal nanocrystals is obtained directly in one stage.

Against all expectations, the inventors have found with the greatest surprise that it is in fact possible to prepare a composition of such metal nanocrystals—in particular metal oxide nanocrystals—directly by using as the ligand at least one PEG ligand and an organic solvent which is compatible with each PEG ligand. Indeed, such a PEG ligand which is soluble in water is necessarily hydrophilic and, as such, to date was considered as absolutely detrimental with respect to the reaction and the organometallic precursors, in particular due to the fact that a priori it inevitably has the consequence of introducing water into the reaction medium. However, it is found that this is not the case at all for reasons which to date remain unexplained.

In addition, the inventors have found that this surprising result can be obtained with a wide variety of PEG ligands, and that in reality it is sufficient to replace the hydrocarbon aliphatic alkyl chain of the ligands used in the state of the art by a chain containing at least one [—$OCH_2CH_2$]$_n$ group, n being an integer greater than or equal to 1, that is to say a group containing at least one oxyethylene motif [—$OCH_2CH_2$], more particularly at least one (linear) polyoxyethylene group [$OCH_2CH_2$]$_n$, n being greater than 1.

Advantageously, a PEG ligand according to the invention is chosen from the group of organic ligands which are soluble in water and contain at least one carbon chain which has at least one (linear) polyoxyethylene group [$OCH_2CH_2$]$_n$, n being an integer greater than 1, and of which at least one end is functionalized by a coordinating group chosen from a primary amine —$R^3NH_2$, a carboxyl group —$R^4COOH$, a thiol group —$R^5SH$, a phosphine group —$R^6P(Ph)_2$, Ph representing phenyl, a phosphonate group chosen from —$PO(OR^7)(OR^8)$, —$PO(O^-)_2$ and —$PO(O^-)(OH)$; $R^3$, $R^4$, $R^5$, $R^6$ representing a group containing at least one aliphatic chain, $R^7$ and $R^8$ being chosen from a hydrogen atom and a group containing at least one aliphatic chain.

This polyoxyethylene group of a PEG ligand of a composition of metal oxide nanocrystals obtained by a method according to the invention is an unbranched linear group. Preferably, said carbon chain is also an unbranched linear chain. At all events, said carbon chain has a linear main chain incorporating at least one—in particular one and only one—(unbranched linear) polyoxyethylene group as mentioned above.

Advantageously, a PEG ligand according to the invention is an organic ligand which contains not only at least one [$OCH_2CH_2$]$_n$ group as mentioned above, but also, as a coordinating group, at least one group chosen from carbonyls, nitrogen oxides, amino alcohols, nitriles (in particular cyano), thiols, thiocyanates, isothiocyanates, alkynes, alkenes, arenes (e.g.: cyclopentadiene), carbenes, siloxanes, Lewis acids, such as boranes and aminoboranes, phosphines, phosphine oxides, phosphates, phosphonates, imines (Schiff's bases), diazo compounds, amines, amine oxides, xanthates (R—OC(S)SR'), sulfites, thionyls, thiosulfates, sulfates, cyclodextrins, epoxides, excluding ethylene glycol.

Advantageously and according to the invention, at least one PEG ligand, called amino/carboxy-PEG ligand, is chosen from the group of amines and carboxylic acids which contain at least one carbon chain having at least one [—$OCH_2CH_2$]$_n$ group, n being an integer greater than or equal to 1, and are soluble in water. Other organic compounds can be used as the PEG ligand (for example thiol-PEG, phosphine-PEG . . . ) according to the uses, and in particular according to each metal compound concerned.

The PEG ligands, such as the amines and the carboxylic acids, having at least one group derived from oxyethylene, and more particularly at least one polyoxyethylene group (said PEG ligands being derived from ethylene glycol, and more particularly from poly(ethylene glycol) PEG), are soluble in the majority of organic solvents and in water. Such PEG ligands are thus on the one hand soluble both in said aprotic solvent medium and in aqueous media, and on the other hand, completely unexpectedly and contrary to all presumptions, in spite of their very hydrophilic and therefore necessarily hydrated, in a significant and uncontrolled proportion, character prove to be compatible with the obtaining of metal nanocrystals—in particular metal oxide nanocrystals—under conditions which are almost identical to those of aliphatic amine and aliphatic carboxylic acid ligands (doped with hydrocarbon aliphatic alkyl chains) traditionally used.

The inventors have thus been able to determine that all the efforts undertaken up till now to replace hydrophobic ligands or to functionalize them or to encapsulate them in surfactants are in reality vain. Indeed, the preparation method can be implemented by direct contact starting from at least one organometallic precursor in liquid solution in an aprotic solvent medium with at least one PEG ligand, and in particular an amino/carboxy-PEG ligand, which is capable of being soluble both in said aprotic solvent medium and in water and aqueous media.

Advantageously and according to the invention, at least one PEG ligand, called amino/carboxy-PEG ligand, is thus chosen from the group of amines and carboxylic acids which contain at least one carbon chain having at least one [—OCH$_2$CH$_2$]$_n$ group, n being an integer greater than or equal to 1, and are soluble in water. More particularly, advantageously and according to the invention, at least one amino/carboxy-PEG ligand is chosen from α-amino-poly(ethylene glycol), bis-amino-poly(ethylene glycol), α-carboxy-poly(ethylene glycol), bis-carboxy-poly(ethylene glycol) and α-amino-ω-carboxy-poly(ethylene glycol).

Such an amino/carboxy-PEG ligand used in a method according to the invention is a derivative of ethylene glycol or of a PEG of which at least one end is functionalized by a group chosen from a primary amine —RNH$_2$ and a carboxyl group —R'COOH, that is to say of which the general formula (I) is the following:

in which:
R$^1$ is chosen from a primary amine —R$^3$NH$_2$, a carboxyl group —R$^4$COOH, a thiol group —R$^5$SH, a phosphine group —R$^6$P(Ph)$_2$, Ph representing phenyl, a phosphonate group—chosen from —PO(OR$^7$)(OR$^8$), —PO(O$^-$)$_2$ and —PO(O$^-$)(OH); R$^3$, R$^4$, R$^5$, R$^6$ representing a group containing at least one aliphatic chain, R$^7$ and R$^8$ being chosen from a hydrogen atom and a group containing at least one aliphatic chain, R$^2$ is chosen from a hydrogen atom, an alkyl group, an unbranched fatty chain, a primary amine —R$^3$NH$_2$, a carboxyl group —R$^4$COOH, a thiol group —R$^5$SH, a phosphine group —R$^6$P(Ph)$_2$, Ph representing phenyl, a phosphonate group—chosen from —PO(OR$^7$)(OR$^8$), —PO(O$^-$)$_2$ and —PO(O$^-$)(OH); R$^3$, R$^4$, R$^5$, R$^6$ representing a group containing at least one aliphatic chain, R$^7$ and R$^8$ being chosen from a hydrogen atom and a group containing at least one aliphatic chain, n is an integral number greater than or equal to 1.

Furthermore, advantageously and according to the invention, each PEG ligand used has an average molecular weight of between 300 g.mol$^{-1}$ and 20,000 g.mol$^{-1}$—in particular between 500 g.mol$^{-1}$ and 5,000 g.mol$^{-1}$.

For example, advantageously and according to the invention, at least one amino/carboxy-PEG ligand chosen from the group consisting of:
bis(3-propylamine)-poly(ethylene glycol) of the formula H$_2$NC$_3$H$_6$[—OCH$_2$CH$_2$]$_n$—OC$_3$H$_6$NH$_2$, having a molecular weight of the order of 1,500 g.mol$^{-1}$,
bis(2-ethylamine)-poly(ethylene glycol) of the formula H$_2$NC$_2$H$_4$[—OCH$_2$CH$_2$]$_n$—OC$_2$H$_4$NH$_2$, having a molecular weight of the order of 3,000 g.mol$^{-1}$ to 10,000 g.mol$^{-1}$,
α-(2-ethylamine)-methoxy(ethylene glycol) of the formula H$_3$C[—OCH$_2$CH$_2$]$_n$—OC$_2$H$_4$NH$_2$, having a molecular weight of the order of 750 g.mol$^{-1}$,
poly(ethylene glycol)dicarboxylic acid of the formula HOOC—CH$_2$[—OCH$_2$CH$_2$]$_n$—O—CH$_2$—COOH, having a molecular weight of the order of 600 g.mol$^{-1}$,
poly(ethylene glycol) methyl ether-carboxylic acid of the formula H$_3$C[—OCH$_2$CH$_2$]$_n$—O—CH$_2$—COOH, having a molecular weight of the order of 3,000 g.mol$^{-1}$, is used.

Preferably, in a method according to the invention an amount of PEG ligand(s) equimolar to that of the metal atoms of the precursor(s) is used. In other words, a stoichiometric amount of PEG ligand(s) with respect to the corresponding metal atoms of the precursor(s) is used.

Advantageously and according to the invention, at least one ligand which is not volatile at the reaction temperature, acting as a dispersing agent for the composition produced in the aprotic solvent medium, is chosen. The oxide nanocrystals are thus spontaneously in the dispersed (colloidal) state in the final composition.

In a method according to the invention, the reaction conditions are chosen and adapted such that the formation of nanocrystals by decomposition of each organometallic precursor is obtained directly. The reaction conditions chosen comprise in particular:
the choice of the aprotic solvent medium;
the choice of the ligand(s);
the initial concentrations;
the reaction temperature;
the reaction pressure;
the choice of the oxidizing agent.

The method of the invention thus consists in carrying out a direct chemical oxidation reaction and decomposition of at least one organometallic precursor in liquid solution. It is distinguished from sol-gel methods in particular in that the direct oxidation of the spontaneously reactive precursor(s), which is not an (are not) alcoholate(s), is carried out in a non-aqueous medium, without a catalyst (such as a mineral acid or a mineral base), without passing through a controlled hydrolysis stage causing the formation of hydroxides forming a gel (inorganic polymer), and without necessitating a subsequent calcining stage to obtain the oxides in the crystalline state. In a method according to the invention, the metal oxide nanocrystals are indeed obtained by solely bringing the liquid solution into contact with an oxidizing medium, without a subsequent stage, in particular without a calcining stage.

The liquid solution can be left to stand in the presence of the PEG ligand(s) in the absence of any oxidizing agent for a predetermined duration before the oxidation is carried out. This duration can be, for example, several hours, in particular of the order of 10 h to 20 h.

The metal oxide nanocrystals obtained according to the invention can be entirely spherical (isotropic dimensions) or on the other hand can have a shape anisotropy, that is to say in particular can be elongated in the form of filaments. Advantageously and according to the invention, the metal oxide nanocrystals are entirely spherical nanoparticles with an average dimension of between 1 nm and 5 nm.

Alternatively, advantageously and according to the invention, the metal oxide nanocrystals are elongated nanoparticles having an average transverse dimension of between 1 nm and 7 nm.

Advantageously and according to the invention, at least one base and at least one acid are chosen as PEG ligands. Advantageously and according to the invention, at least one amine, as the base, in particular a primary amine as mentioned above, and at least one carboxylic acid are used.

The use of an acid/base pair enables in particular supercrystals of nanocrystals to be obtained, that is to say an organization of the nanocrystals into a solid network similar to a crystal lattice. The molar proportions of acid, base and precursor can vary. Supercrystals of ZnO nanocrystals have been obtained, for example, in THF with the acid/base/precursor molar proportions of 0.5/1/1; 1/0.5/1; and 1/1/1.

In a method of the invention, said aprotic solvent medium comprises at least one solvent which is chosen such as to enable on the one hand dissolution of each organometallic precursor, and on the other hand of each PEG ligand used, and to enable the oxidation reaction to proceed to obtain metal oxide nanocrystals. Advantageously and according to the invention, said aprotic solvent medium comprises a solvent chosen from THF, toluene, anisole and methylene chloride.

Advantageously and according to the invention, the aprotic solvent medium is non-aqueous and non-alcoholic, that is to say is also free from any compound having reactive hydroxyl functions, such that any formation of hydroxide is avoided. In particular, the aprotic solvent medium is advantageously free (except for traces) from water and alcohol functions, and therefore is free from any alcohol compounds (primary, secondary or tertiary).

In a method according to the invention, said aprotic solvent medium comprises at least two distinct compounds. In particular, advantageously and according to the invention, said aprotic solvent medium comprises at least one PEG ligand and at least one compound which is volatile under the reaction conditions and evaporates progressively with the oxidation.

In a particular embodiment of the invention, said aprotic solvent medium is thus chosen such that it has a liquid phase which is volatile progressively with the oxidation reaction so that the nanocrystals obtained are in the form of a powder at the end of the reaction. Advantageously and according to the invention, said aprotic solvent medium thus comprises at least one PEG ligand and at least one liquid compound which is volatile under the reaction conditions, said volatile liquid compound being chosen such that it evaporates progressively with the formation of the nanocrystals, and such that the nanocrystals are obtained directly in the form of a powder.

Furthermore, the inventors have found that said aprotic solvent medium and its structure enable the size, the shape and the size distribution of the nanocrystals to be controlled.

Moreover, advantageously and according to the invention, the production of the nanocrystals is carried out under ambient pressure and at a temperature of between 0° C. and 200° C.—in particular at ambient temperature. In the majority of cases, the oxidation can be carried out under ambient pressure and at a temperature below 50° C.—in particular at ambient temperature. The method according to the invention is thus of extreme simplicity.

Advantageously and according to the invention, preferably and if possible, each precursor is chosen such that each oxidation residue formed from this precursor is volatile under the reaction conditions. Thus, in a method according to the invention the oxidation reaction produces only solid metal oxide nanocrystals and (a) volatile organic residue(s). With a volatile solvent medium, and if the oxidation residue(s) is(are) volatile, the composition resulting from the oxidation reaction is solid. It can be taken up in another solvent medium, including aqueous, and then forms a liquid colloidal solution. There is nothing to prevent, alternatively, choosing a precursor of which the oxidation residues are not volatile under the reaction conditions.

Taking into account the above, the method according to the invention can be implemented with all the elements for which there exists an organometallic precursor which is spontaneously reactive to oxidation and can be placed in liquid solution in an aprotic solvent medium compatible with the solubilization, in a sufficient quantity, of at least one PEG ligand.

Among these elements there may be mentioned: zinc, iron, cobalt, cadmium, boron, aluminum, gallium, indium, thallium, germanium, tin, titanium, zirconium, hafnium, the lanthanides (Ce, Pr, Nd, Sm, Eu, Gd, Tb, Dy, Ho, Er, Tm, Yb, Lu), scandium, yttrium, silicon, bismuth and the other transition metals.

Examples which may be mentioned of organometallic precursors which are spontaneously reactive to oxidation and can be used in a method according to the invention are complex coordination compounds containing at least one of the above-mentioned elements and at least one group chosen from amides, alkyls, aryls, cyclopentadienyls, olefins, polyolefins, alkynes, alkynines, silyls.

Advantageously and according to the invention, for the preparation of a water-compatible composition of nanocrystals of zinc oxide dicyclohexylzinc $Zn(C_6H_{11})_2$, commonly designated $ZnCy_2$, is chosen as the precursor. In the presence of at least one PEG ligand in an equimolar proportion with this precursor in THF and by carrying out the oxidation with air at ambient temperature, a homogeneous sample of dispersed nanocrystals of crystalline zinc oxide (zincite phase) of average dimension of between 1 nm and 10 nm and having a narrow size distribution was obtained. These semiconductor nanocrystals are also photoluminescent. Such nanocrystals which are soluble both in an aqueous medium and in an organic medium are of considerable practical industrial interest.

Advantageously and according to the invention, for the preparation of a water-compatible composition of nanocrystals of cobalt oxide, cobalt bis-bis-trimethyl-silylamide $Co[N(Si(CH_3)_3)_2]_2$ is used as the organometallic precursor.

Advantageously and according to the invention, for the preparation of a water-compatible composition of nanocrystals of iron oxide, iron bis-bis-trimethyl-silylamide $Fe[N(Si(CH_3)_3)_2]_2$ is used as the organometallic precursor.

Advantageously and according to the invention, for the preparation of a water-compatible composition of nanocrystals of tin oxide, tin bis-bis-dimethylamide $[Sn(N(CH_3)_2)_2]_2$ is chosen as the organometallic precursor.

Advantageously and according to the invention, for the preparation of a water-compatible composition of nanocrystals of indium oxide, trimethylindium $In(CH_3)_3$ is chosen.

Advantageously and according to the invention, for the preparation of a water-compatible composition of a mixed metal oxide, at least two distinct precursors from the group formed by dicyclohexylzinc $Zn(C_6H_{11})_2$, cobalt bis-bis-trimethyl-silylamide $Co[N(Si(CH_3)_3)_2]_2$, iron bis-bis-trimethyl-silylamide $Fe[N(Si(CH_3)_3)_2]_2$, tin bis-bis-dimethylamide $[Sn(N(CH_3)_2)_2]_2$, and trimethylindium $In(CH_3)_3$ are chosen.

These examples are not limiting; other precursors can equally well be used.

Advantageously and according to the invention, at least one oxidizing agent chosen from dioxygen, water vapor, liquid water, organic oxidizing agents and other non-organic oxidizing agents is used.

Organic oxidizing agents which may be mentioned are, for example, organic hydroperoxides and amine oxides, such as trimethylamine oxide. Non-organic oxidizing agents which may be mentioned are, for example, hydrogen peroxide, phosphorus oxide, sulfur oxide, nitrogen dioxide, ozone, chlorine dioxide and metal complexes which carry at least one oxygen atom (for example metal peroxide complexes, metal oxide complexes, metal hydroperoxide complexes, metal superoxide complexes . . . ).

Advantageously and according to the invention, the oxidation is carried out without agitation of the liquid solution. The traces of water which this liquid solution may contain may act as an oxidizing agent. The liquid solution is also brought into contact with atmospheric air. In particular, in an advantageous embodiment and according to the invention, a volatile solvent agent and at least one organometallic precursor which forms a volatile oxidation residue are used, and the liquid solution is left in contact with ambient air without agitation. The solvent agent evaporates progressively as the air oxidizes the precursor in solution, and the oxidation residue other than the metal oxide evaporates. In reality, it is possible that the oxidation is due to only traces of water solubilized generated by starting volatile solvent agent and the ambient air (always damp). A solid composition of metal oxide (with possibly each ligand at the surface of the nanocrystals) finally remains.

Oxidizing agents other than the solubilized traces of water and/or the ambient air can be used, in particular water vapor, liquid water, pure dioxygen . . . . However, it is an advantage of the method of the invention to enable spontaneous production of nanocrystals of crystalline oxide(s) by simply bringing into contact with ambient air.

The invention enables a water-compatible and organocompatible composition of nanocrystals of at least one metal oxide in the form of a powder or of a colloidal solution and having shapes and dimensions corresponding to a unimodal distribution to be obtained.

With a method according to the invention, it is possible to obtain in a selective, reproducible and quantitative manner the crystalline metal oxide in the state of perfectly dispersed (non-agglomerated) water-compatible nanocrystals which have shapes and dimension which are at least substantially uniform, that is to say according to a unimodal, in particular substantially homogeneous (low dispersion) distribution, and which can even be monodisperse.

The invention relates to a composition obtained by a method according to the invention. The invention thus relates to a composition of nanoparticles, called, metal oxide nanocrystals, of at least one metal oxide in the crystalline state, which comprises at least one ligand, called PEG ligand, chosen from the group of organic compounds which are soluble in water and contain at least one carbon chain which has at least one [—$OCH_2CH_2$]$_n$ group, n being an integer greater than or equal to 1, and at least one end of which is functionalized by a coordinating group containing at least one hetero atom, and are soluble in water, wherein at least one PEG ligand is in direct interaction (by a coordination bond) with the metal oxide nanocrystals by at least one coordinating group containing at least one hetero atom, such that this composition of metal oxide nanocrystals is water-compatible and organocompatible.

In particular, advantageously, a composition according to the invention comprises at least one PEG ligand chosen from the group of organic compounds which are soluble in water and contain at least one carbon chain:
 containing at least one polyoxyethylene group [—$OCH_2CH_2$]$_n$, n being an integer greater than 1,
 at least one end of which is functionalized by a coordinating group in direct interaction with the surface of the metal oxide nanocrystals and chosen from a primary amine —$R^3NH_2$, a carboxyl group —$R^4COOH$, a thiol group —$R^5SH$, a phosphine group —$R^6P(Ph)_2$, Ph representing phenyl, a phosphonate group chosen from —$PO(OR^7)(OR^8)$, —$PO(O^-)_2$ and —$PO(O^-)(OH)$; $R^3$, $R^4$, $R^5$, $R^6$ representing a group containing at least one aliphatic chain, $R^7$ and $R^8$ being chosen from a hydrogen atom and a group containing at least one aliphatic chain.

A polyoxyethylene group of a PEG ligand of a composition according to the invention is an unbranched linear group. Preferably, said carbon chain is also an unbranched linear chain. At all events, said carbon chain has a linear main chain incorporating at least one polyoxyethylene group as mentioned above.

In a composition of the invention, the molecules of the PEG ligand are in direct interaction with the surface of the metal oxide nanocrystals, that is to say are bonded to metal atoms and/or to oxygen atoms. More precisely, a coordinating group on the end of each molecule of the PEG ligand is bonded (by a coordination bond, that is to say in particular excluding a bond by weak interactions of the Van der Waals type, which is not a coordination bond in the context of the invention) to at least one such metal and/or oxygen atom of the metal oxide nanocrystals.

In addition, advantageously, a composition according to the invention is also characterized in that each PEG ligand conforms to all or some of the characteristics mentioned above with reference to the method according to the invention.

Advantageously, a composition according to the invention is a dispersion of nanocrystals in the form of an aqueous colloidal solution.

In a composition of the invention, the metal nanocrystals are chosen from the group formed by nanocrystals of zinc oxide, nanocrystals of cobalt oxide, nanocrystals of iron oxide, nanocrystals of a mixed oxide of iron and cobalt, nanocrystals of indium oxide, nanocrystals of tin oxide, nanocrystals of a mixed oxide of indium and tin. These examples are not limiting and other metal oxide nanocrystals can be obtained in accordance with the invention.

Advantageously and according to the invention, the metal oxide nanocrystals are entirely spherical nanoparticles with an average dimension of between 1 nm and 5 nm. Alternatively, advantageously and according to the invention, the metal oxide nanocrystals have a shape anisotropy (they are not spherical). Advantageously and according to the invention, the metal oxide nanocrystals have an elongated shape with an average width of less than 50 nm and an average length greater than two times the average width. Advantageously and according to the invention, the metal oxide nanocrystals have an average width of between 1 nm and 7 nm and an average length of between 10 nm and 20 nm.

The invention also relates to a method and a composition which comprise a combination of all or some of the characteristics mentioned above or below.

Other aims, characteristics and advantages of the invention will emerge from reading the following examples and the attached FIGS. 1 to 16, which show microscopic views and absorption and NMR spectra of compositions according to the invention obtained in the examples.

DETAILED DESCRIPTION OF THE INVENTION

A liquid solution of the PEG ligand(s) in 6 ml of aprotic solvent medium dried beforehand (such that a residual amount of water of the order of 50 ppm (measured by Karl Fisher titration) is present in the said aprotic solvent medium) is prepared under an argon atmosphere. The concentration of PEG ligand(s) in this solution is of 0.021 mol.l$^{-1}$, 0.042 mol.l$^{-1}$ or 0.084 mol.l$^{-1}$. The solution is agitated under ultrasound at ambient temperature for half an hour such that a transparent solution is obtained. An amount of 0.25 mmol of at least one organometallic precursor is then added. The concentration of precursor can be modified depending on the desired size of the nanocrystals, as disclosed in WO2004/092069.

BRIEF DESCRIPTION OF THE DRAWING FIGURES

A transparent solution is obtained. The solution is then placed in contact with ambient air and ambient humidity. It remains in contact with the air and the ambient humidity for a duration d, for example of the order of four days, which generally corresponds to the time necessary for total evaporation of the solvent if this is sufficiently volatile at ambient temperature. In the case where the solvent has not evaporated completely at the end of some days, it is found that metal oxide nanocrystals are formed. If the solvent is sufficiently volatile and has evaporated completely, a solid composition corresponding to a sample of metal oxide nanocrystals is obtained. This solid composition can be dispersed in a suitable organic or aqueous solvent, generally up to concentrations varying between 1 mg.ml$^{-1}$ and 3 mg.ml$^{-1}$.

In the particular case of ZnO, if the aprotic solvent reaction medium is not volatile enough to be evaporated completely, the formation of nanocrystals can be verified by irradiating the solution under UV ($\lambda$=312 nm), this becoming luminescent. Generally, all the colloidal liquid solutions of ZnO obtained have luminescence properties. If a solid sample is obtained, the diffraction on the powder of this sample enables the crystalline phase obtained to be verified. In the case of ZnO, the diffractogram obtained corresponds to ZnO in the hexagonal zincite phase having the space group P$_{63}$mc. Additional diffraction peaks correspond to organic species. These species have been characterized by NMR in solution and correspond to ligand(s) present on the surface of the particles. In the case of colloidal liquid solutions, the electron diffraction of samples deposited on the microscopy grating enables the crystallinity of the nanocrystals to be verified. Nanocrystals were obtained in all the examples. These microscopy gratings are prepared by depositing a drop of the colloidal liquid solution on the grating. The use of transmission electron microscopy, TEM, also enables the size, the shape and the homogeneity of the nanocrystals formed to be observed.

In all the examples colloidal solutions could be obtained both in various organic solvent media and in water, the color of each colloidal solution corresponding to that of each metal oxide under consideration. In the case of zinc oxide, the state of the surface of these nanocrystals was studied by NMR in solution and the presence of ligand(s) introduced into the reaction medium was confirmed. The nanocrystals synthesized by this method form entities which behave like any conventional chemical product and have, for example, a saturation concentration at which a colloidal solution changes into a turbid suspension. This concentration is intrinsic to each system.

In all that follows and on the figures, the following abbreviations are used:

BisAmPEG10000: bis(2-ethylamine)-poly(ethylene glycol) of the formula H$_2$NC$_2$H$_4$[—OCH$_2$CH$_2$]$_n$—OC$_2$H$_4$NH$_2$, having a molecular weight of the order of 10,000 g.mol$^{-1}$, BisAmPEG1500: bis(3-propylamine)-poly(ethylene glycol) of the formula H$_2$NC$_3$H$_6$[—OCH$_2$CH$_2$]$_n$—OC$_3$H$_6$NH$_2$, having a molecular weight of the order of 1,500 g.mol$^{-1}$, MonoAmPEGMn: $\alpha$-(2-ethylamine)-methoxy(ethylene glycol) of the formula H$_3$C[—OCH$_2$CH$_2$]$_n$—OC$_2$H$_4$NH$_2$, having a molecular weight of the order of Mn, BisAcPEGMn: poly(ethylene glycol)dicarboxylic acid of the formula HOOC—CH$_2$[—OCH$_2$CH$_2$]$_n$—O—CH$_2$—COOH, having a molecular weight of the order of Mn, MonoAcPEGMn: poly(ethylene glycol) methyl ether-carboxylic acid of the formula H$_3$C[—OCH$_2$CH$_2$]$_n$—O—CH$_2$—COOH, having a molecular weight of the order of Mn, Zn(Cy)$_2$: dicyclohexylzinc Zn(C$_6$H$_{11}$)$_2$, Co(TMSA): cobalt bis-bis-trimethyl-silylamide Co[N(Si(CH$_3$)$_3$)$_2$]$_2$, Fe(TMSA): iron bis-bis-trimethyl-silylamide Fe[N(Si(CH$_3$)$_3$)$_2$]$_2$, Sn(TMSA): tin bis-bis-dimethylamide [Sn(N(CH$_3$)$_2$)$_2$]$_2$, In(Me)$_3$: trimethylindium In(CH$_3$)$_3$.

EXAMPLE 1

In this example, nanocrystals of zinc oxide ZnO are prepared in accordance with the protocol mentioned above in 6 ml of THF, dehydrated beforehand, in the presence of a concentration Cl of the ligand BisAmPEG1500 and using the precursor Zn(Cy)$_2$ in an amount of 0.25 mmol, that is to say 57.9 mg and a concentration of 0.042 mol.l$^{-1}$.

Five solutions were prepared with values of Cl equal respectively to 0.0021 mol.l$^{-1}$ (0.05 eq); 0.0042 mol.l$^{-1}$ (0.10 eq); 0.021 mol.l$^{-1}$ (0.5 eq); 0.042 mol.l$^{-1}$ (1 eq); and 0.084 mol.l$^{-1}$ (2 eq).

Figure 1:
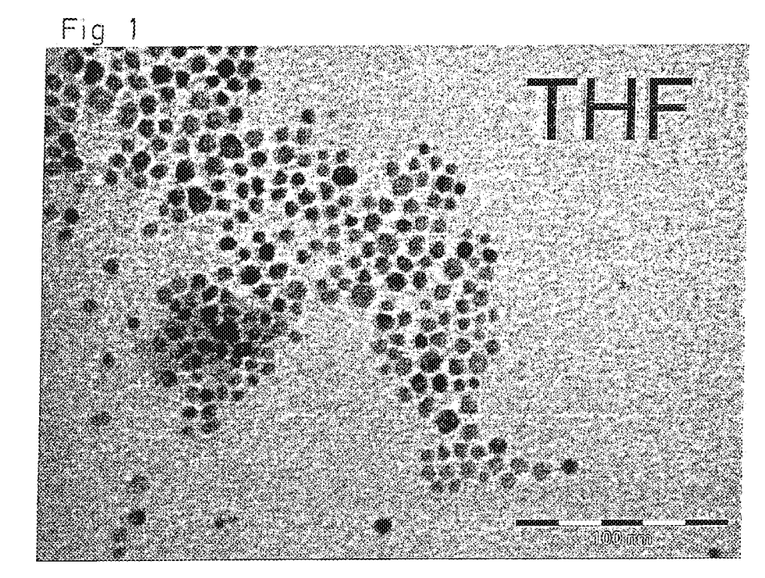
FIG. 1 is a transmission electron microscopy view of the colloidal solution obtained after reaction in THF.

FIG. 1 is a transmission electron microscopy view of the colloidal solution obtained after reaction in THF with Cl=0.084 mol.l$^{-1}$.

Figure 2:
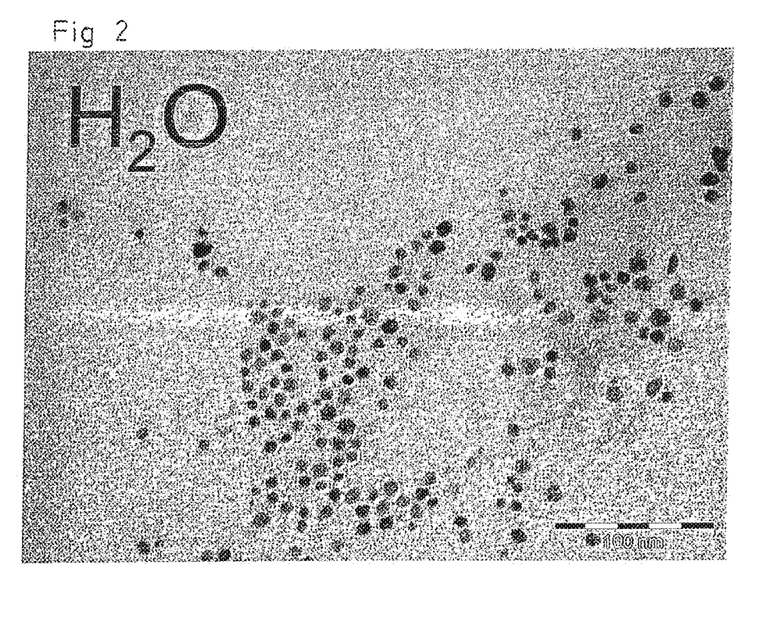
FIG. 2 is a transmission electron microscopy view of an aqueous colloidal solution obtained after redispersion of the nanocrystals in water.

The nanocrystals can be dispersed in water, after evaporation of the THF, in an amount of 1 mg of nanocrystals per 1 ml of distilled water, the mixture being subjected to ultrasound for 15 minutes. FIG. 2 is a transmission electron microscopy view of an aqueous colloidal solution obtained after this redispersion of the nanocrystals in water.

The nanocrystals obtained are in the form of entirely spherical (isotropic dimensions) nanoparticles, the average dimension of which is the following:

for Cl=0.05 eq (0.0021 mol.l$^{-1}$): 7.0±2.7 nm
for Cl=0.10 eq (0.0042 mol.l$^{-1}$): 5.3±1.5 nm
for Cl=0.5 eq (0.021 mol.l$^{-1}$): 4.7±1.3 nm
for Cl=1.0 eq (0.042 mol.l$^{-1}$): 4.3±1.5 nm
for Cl=2.0 eq (0.084 mol.l$^{-1}$): 3.9±0.8 nm The nanocrystals are photoluminescent with an emission band centered on $\lambda_{em}$ under luminous excitation with an excitation wavelength $\lambda_{ex}$ according to the table below:

| $\lambda_{ex}$ | $\lambda_{em}$ |
|---|---|
| 280 nm to 360 nm | 580 nm (yellow) |
| 360 nm to 380 nm | 460 nm and 580 nm (white) |
| 380 nm to 420 nm | 460 nm (blue) |

The emission at 460 nm (blue) is in particular characteristic of the direct coordination of the ligand BisAmPG1500 via the amine coordinating group with the surface of the nanocrystals of zinc oxide.

Figure 13:
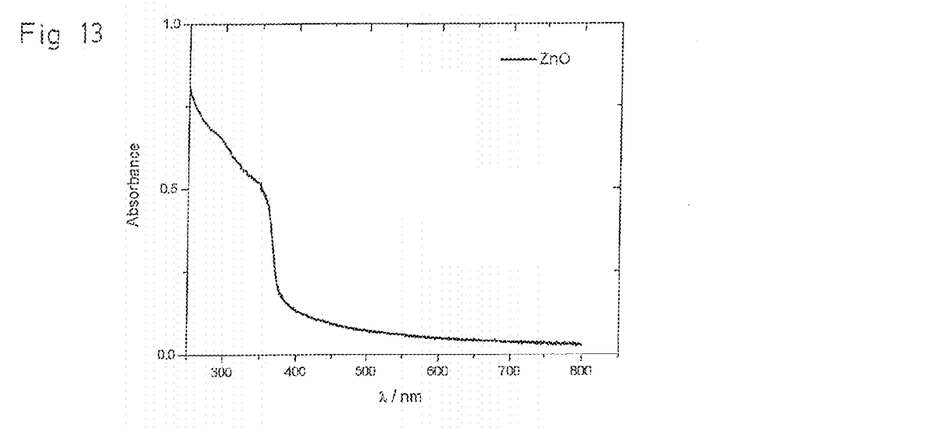
FIG. 13 is an absorption spectrum of the nanocrystals.

The absorption spectrum of the nanocrystals obtained shown in FIG. 13 confirms, like the x-ray analyses carried out, that it is indeed zinc oxide.

EXAMPLE 2

In this example, nanocrystals of zinc oxide are prepared in accordance with the protocol mentioned above in 6 ml of THF, dehydrated beforehand, in the presence of a concentration of 0.042 mol.l$^{-1}$ of the ligand BisAmPEG10000 and using the precursor Zn(Cy)$_2$ in an amount of 0.25 mmol, that is to say 57.9 mg and a concentration of 0.042 mol.l$^{-1}$.

Figure 3:
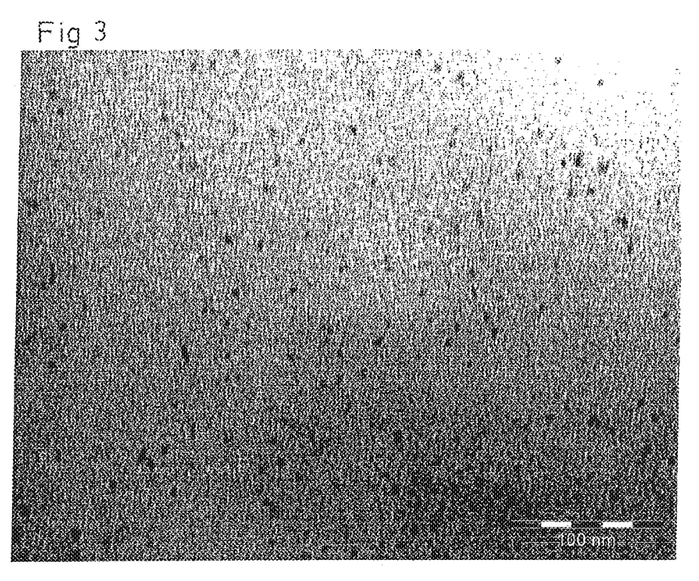
FIG. 3 is a transmission electron microscopy view showing nanocrystals.

FIG. 3 is a transmission electron microscopy view showing the nanocrystals obtained.

The nanocrystals obtained are in the form of entirely spherical (isotropic dimensions) nanoparticles of zinc oxide, the average dimension of which is 3.9±0.9 nm. They can be dispersed in water to form an aqueous colloidal solution. They have the same photoluminescence properties as those obtained in Example 1.

EXAMPLE 3

In this example, nanocrystals of zinc oxide are prepared in accordance with the protocol mentioned above in 6 ml of THF, dehydrated beforehand, in the presence of a concentration of 0.0042 mol.l$^{-1}$ of the ligand BisAcPEG600 and using the precursor Zn(Cy)$_2$ in an amount of 0.25 mmol, that is to say 57.9 mg and a concentration of 0.042 mol.l$^{-1}$.

Figure 4:
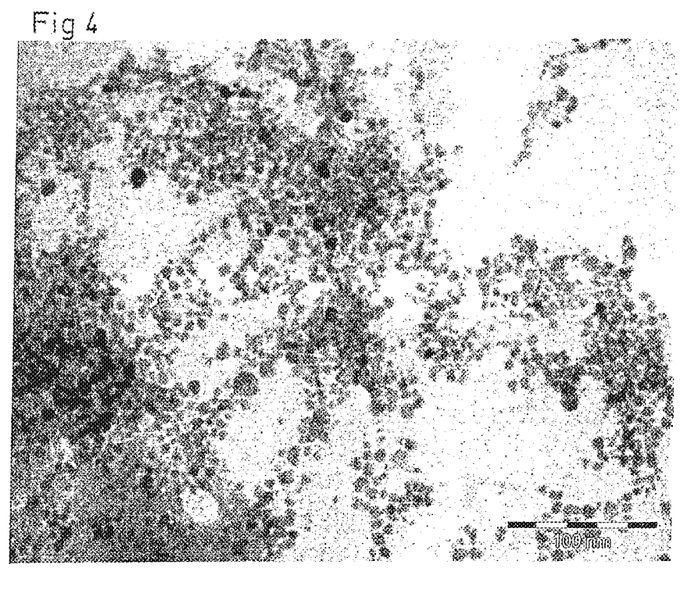
FIG. 4 is a transmission electron microscopy view showing nanocrystals.

FIG. 4 is a transmission electron microscopy view showing the nanocrystals obtained. The nanocrystals obtained are in the form of entirely spherical (isotropic dimensions) nanoparticles of zinc oxide, the average dimension of which is 3.8±1.7 nm. They can be dispersed in water to form an aqueous colloidal solution. They are photoluminescent and have an emission wavelength $\lambda_{em}$ of 580 nm under luminous excitation of wavelength $\lambda_{ex}$ of between 280 nm and 380 nm.

EXAMPLE 4

In this example, nanocrystals of zinc oxide are prepared in accordance with the protocol mentioned above in 6 ml of THF, dehydrated beforehand, in the presence of a concentration of 0.0084 mol.l$^{-1}$ of the ligand BisAmPEG1500 and of 0.0042 mol.l$^{-1}$ of the ligand BisAcPEG600 and using the precursor Zn(Cy)$_2$ in an amount of 0.25 mmol, that is to say 57.9 mg and a concentration of 0.042 mol.l$^{-1}$.

Figure 5:
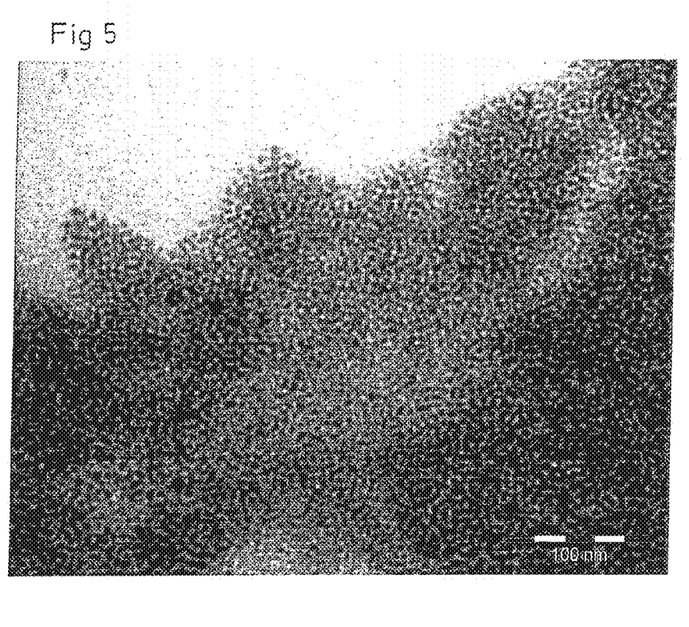
FIG. 5 is a transmission electron microscopy view showing nanocrystals.

FIG. 5 is a transmission electron microscopy view showing the nanocrystals obtained.

The nanocrystals obtained are in the form of entirely spherical (isotropic dimensions) nanoparticles of zinc oxide, the average dimension of which is 3.5±1.0 nm. They can be dispersed in water to form an aqueous colloidal solution. They have the same photoluminescence properties as those obtained in Example 1.

EXAMPLE 5

In this example, nanocrystals of zinc oxide are prepared in accordance with the protocol mentioned above in 6 ml of THF, dehydrated beforehand, in the presence of a concentration of 0.084 mol.l$^{-1}$ of the ligand MonoAmPEG750 and using the precursor Zn(Cy)$_2$ in an amount of 0.25 mmol, that is to say 57.9 mg and a concentration of 0.042 mol.l$^{-1}$.

Figure 6:
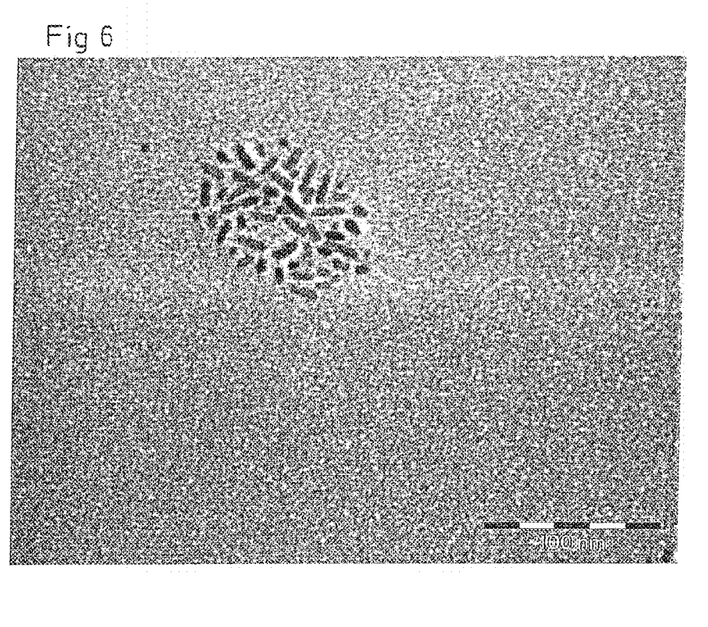
FIG. 6 is a transmission electron microscopy view showing nanocrystals.

FIG. 6 is a transmission electron microscopy view showing the nanocrystals obtained.

The nanocrystals obtained are in the form of nanoparticles of zinc oxide with a shape anisotropy (nanorods) having almost the following dimensions: diameter: 4.9±1.9 nm; length: 16.4±6.9 nm.

They can be dispersed in water to form an aqueous colloidal solution. They have the same photoluminescence properties as those obtained in Example 1.

Figure 16:
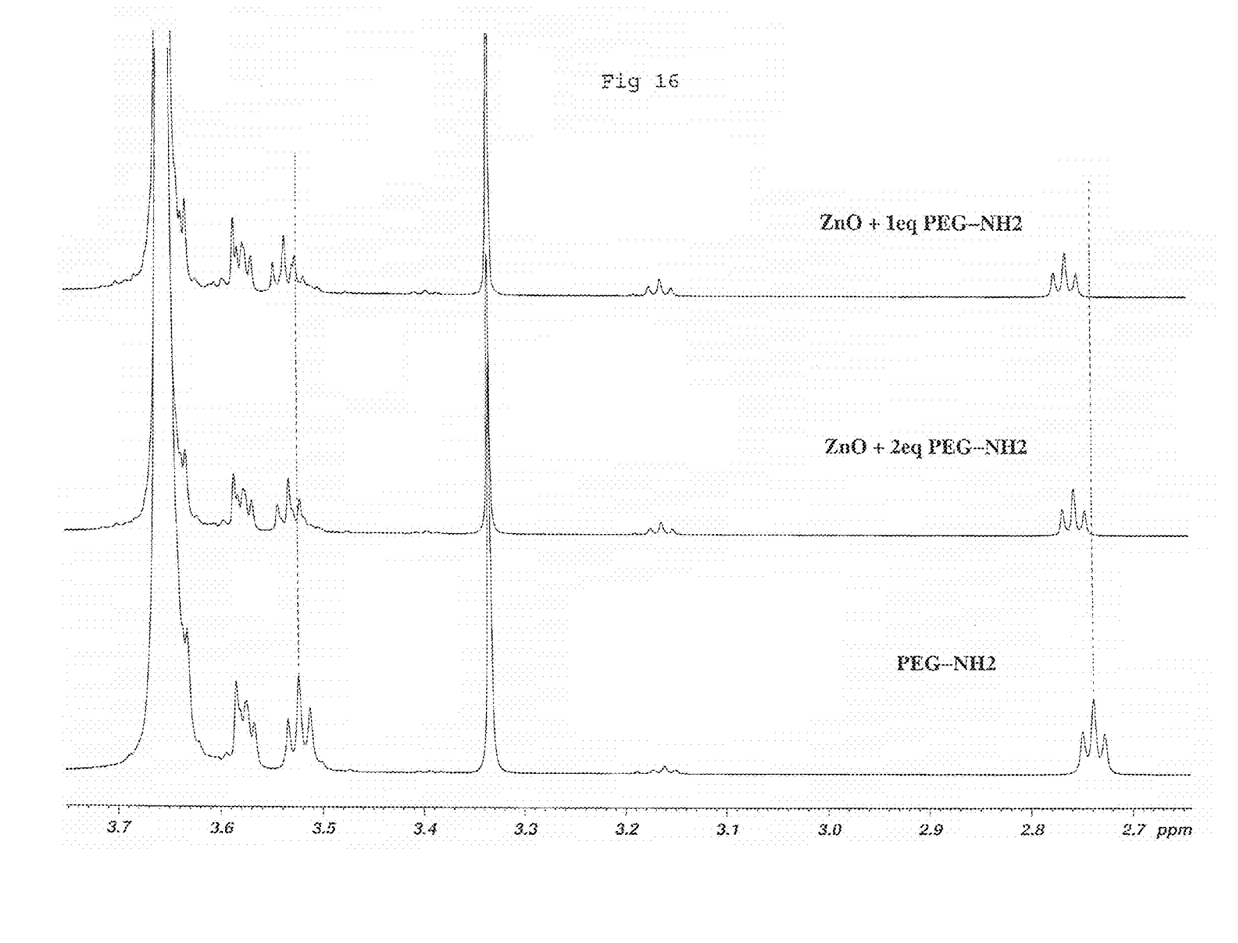
FIG. 16 is an NMR (nuclear magnetic resonance) spectrum.
General Protocol.

FIG. 16 is an NMR (nuclear magnetic resonance) spectrum obtained which is characteristic of the direct coordination of the ligand MonoAmPEG750 via the amine coordinating group with the surface of the nanocrystals of zinc oxide.

EXAMPLE 6

In this example, nanocrystals of zinc oxide are prepared in accordance with the protocol mentioned above in 6 ml of THF, dehydrated beforehand, in the presence of a concentration of 0.084 mol.l$^{-1}$ of the ligand MonoAcPEG3000 and using the precursor Zn(Cy)$_2$ in an amount of 0.25 mmol, that is to say 57.9 mg and a concentration of 0.042 mol.l$^{-1}$.

Figure 7:
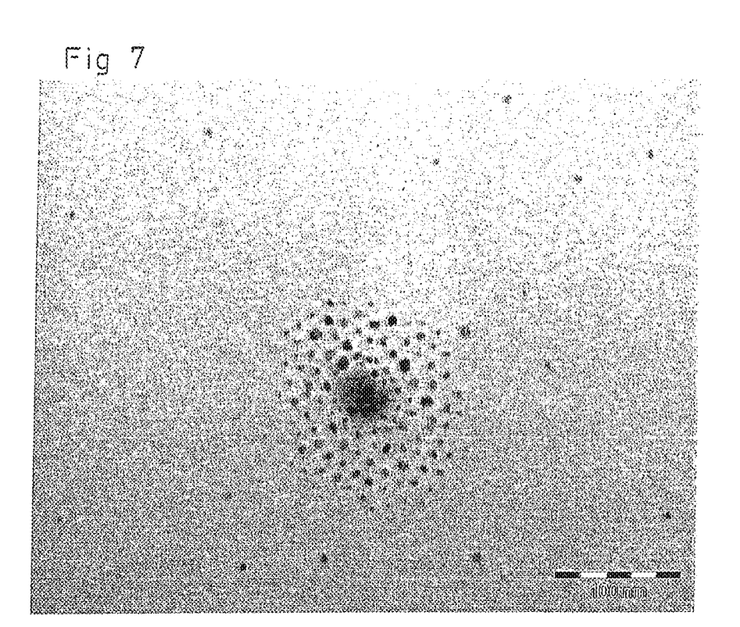
FIG. 7 is a transmission electron microscopy view showing nanocrystals.

FIG. 7 is a transmission electron microscopy view showing the nanocrystals obtained.

The nanocrystals obtained are in the form of entirely spherical (isotropic dimensions) nanoparticles of zinc oxide, the average dimension of which is 4.2±1.7 nm. They can be dispersed in water to form an aqueous colloidal solution. They have the same photoluminescence properties as those obtained in Example 3.

EXAMPLE 7

In this example, nanocrystals of zinc oxide are prepared in accordance with the protocol mentioned above in 6 ml of THF, dehydrated beforehand, in the presence of a concentration of 0.0168 mol.l$^{-1}$ of the ligand MonoAmPEG750 and of 0.084 mol.l$^{-1}$ of the ligand MonoAcPEG3000 and using the precursor Zn(Cy)$_2$ in an amount of 0.25 mmol, that is to say 57.9 mg and a concentration of 0.042 mol.l$^{-1}$.

Figure 8:
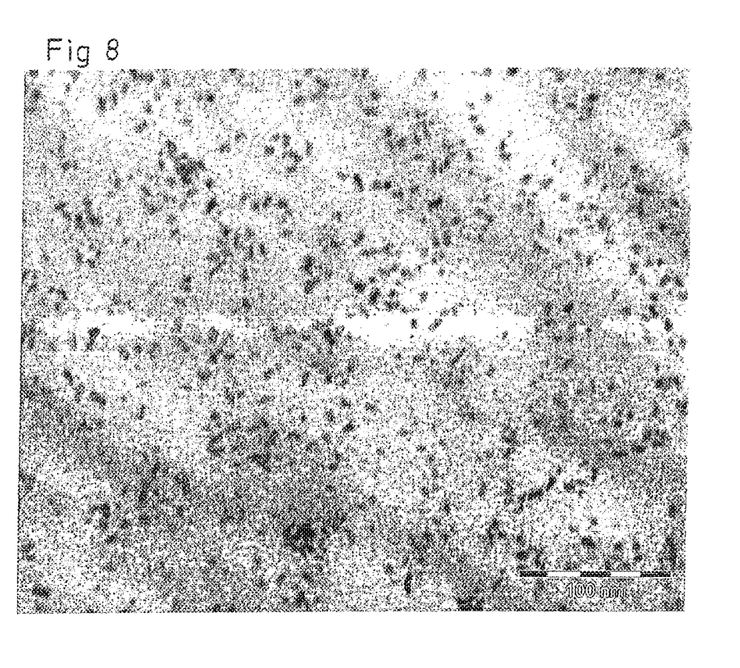
FIG. 8 is a transmission electron microscopy view showing nanocrystals.

FIG. 8 is a transmission electron microscopy view showing the nanocrystals obtained.

The nanocrystals obtained are in the form of nanoparticles of zinc oxide with a shape anisotropy (nanorods) having almost the following dimensions: diameter: 3.7±1.1 nm; length: 7.6±2.3 nm.

They can be dispersed in water to form an aqueous colloidal solution. They have the same photoluminescence properties as those obtained in Example 1.

EXAMPLE 8

Figure 9:
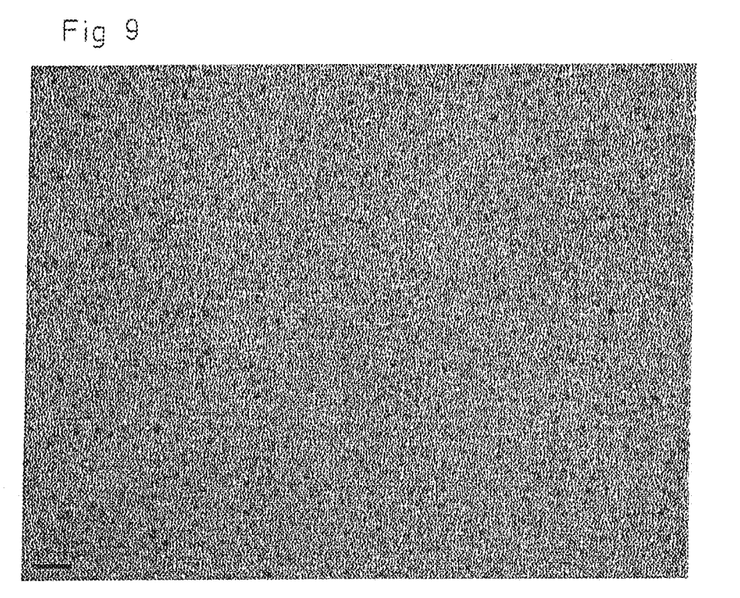
FIG. 9 is a transmission electron microscopy view showing nanocrystals.

This example is identical to Example 1, replacing the THF by anisole. FIG. 9 is a transmission electron microscopy view showing the nanocrystals obtained.

The nanocrystals obtained are in the form of entirely spherical (isotropic dimensions) nanoparticles of zinc oxide, the granulometric distribution of which is 1.5±0.5 nm. They can be dispersed in water to form an aqueous colloidal solution. They have the same photoluminescence properties as those obtained in Example 1.

EXAMPLE 9

Figure 10:
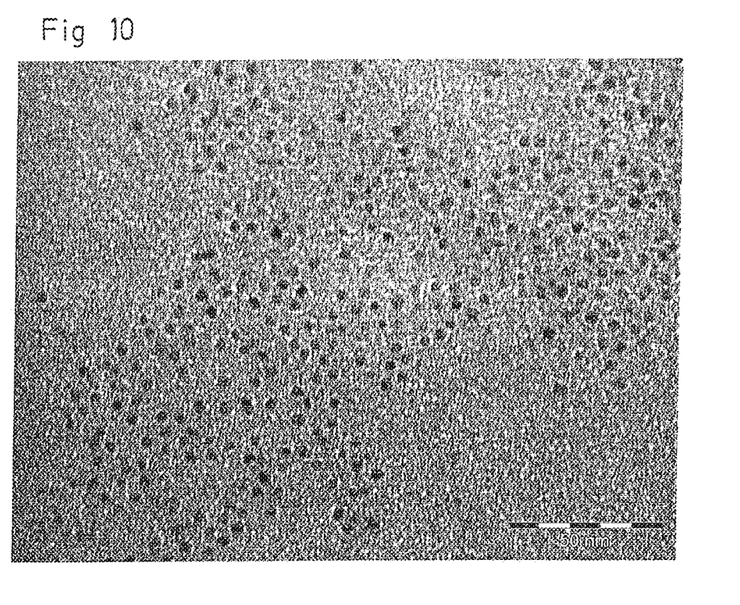
FIG. 10 is a transmission electron microscopy view showing nanocrystals.

This example is identical to Example 1, replacing the THF by toluene. FIG. 10 is a transmission electron microscopy view showing the nanocrystals obtained.

The nanocrystals obtained are in the form of entirely spherical (isotropic dimensions) nanoparticles of zinc oxide, the granulometric distribution of which is 1.8±0.4 nm. They can be dispersed in water to form an aqueous colloidal solution. They have the same photoluminescence properties as those obtained in Example 1.

EXAMPLE 10

Figure 11:
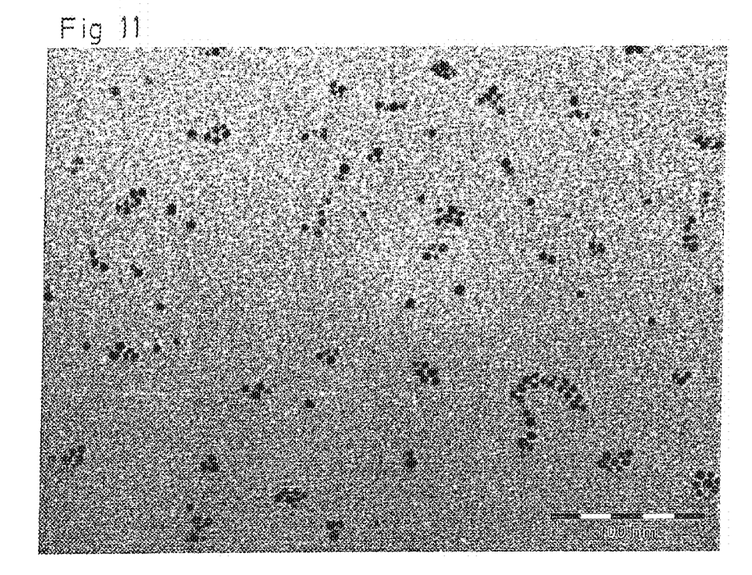
FIG. 11 is a transmission electron microscopy view showing nanocrystals.

This example is identical to Example 1, replacing the THF by methylene chloride. FIG. 11 is a transmission electron microscopy view showing the nanocrystals obtained.

The nanocrystals obtained are in the form of entirely spherical (isotropic dimensions) nanoparticles of zinc oxide, the granulometric distribution of which is 4.0±1.1 nm. They can be dispersed in water to form an aqueous colloidal solution. They have the same photoluminescence properties as those obtained in Example 1.

EXAMPLE 11

This example is identical to Example 1, replacing the zinc precursor by 0.022 mol.l$^{-1}$ of Co(TMSA) such that a composition of nanocrystals of cobalt oxide $Co_3O_4$ is obtained.

A colloidal solution of a maroon color, corresponding to that of cobalt oxide, is obtained. The nanocrystals obtained can then be dispersed in water to form an aqueous colloidal solution.

EXAMPLE 12

This example is identical to Example 11, replacing the cobalt precursor by 0.022 mol.l$^{-1}$ of Fe(TMSA) such that a composition of nanocrystals of iron oxide in the form of maghemite $\gamma$-$Fe_2O_3$ is obtained.

A colloidal solution of a maroon color, corresponding to that of iron oxide, is obtained. The nanocrystals obtained can then be dispersed in water to form an aqueous colloidal solution.

EXAMPLE 13

This example is identical to Example 11, replacing the cobalt precursor by 0.022 mol.l$^{-1}$ of Co(TMSA) and 0.044 mol.l$^{-1}$ of Fe(TMSA), and in the presence of 0.066 mol.l$^{-1}$ of the ligand BisAmPEG1500 such that a composition of nanocrystals of the mixed oxide cobalt ferrite $CoFe_2O_4$ is obtained.

A colloidal solution of a maroon color, corresponding to that of the mixed oxide, is obtained. The nanocrystals obtained can then be dispersed in water to form an aqueous colloidal solution.

EXAMPLE 14

This example is identical to Example 1, replacing the zinc precursor by 0.042 mol.l$^{-1}$ of In(Me)$_3$ and in the presence of 0.042 mol.l$^{-1}$ of the ligand BisAmPEG 1500.

The nanocrystals obtained are in the form of entirely spherical (isotropic dimensions) nanoparticles of indium oxide $In_2O_3$, the average dimension of which is of the order of 8 nm. They can be dispersed in water to form an aqueous colloidal solution.

Figure 12:
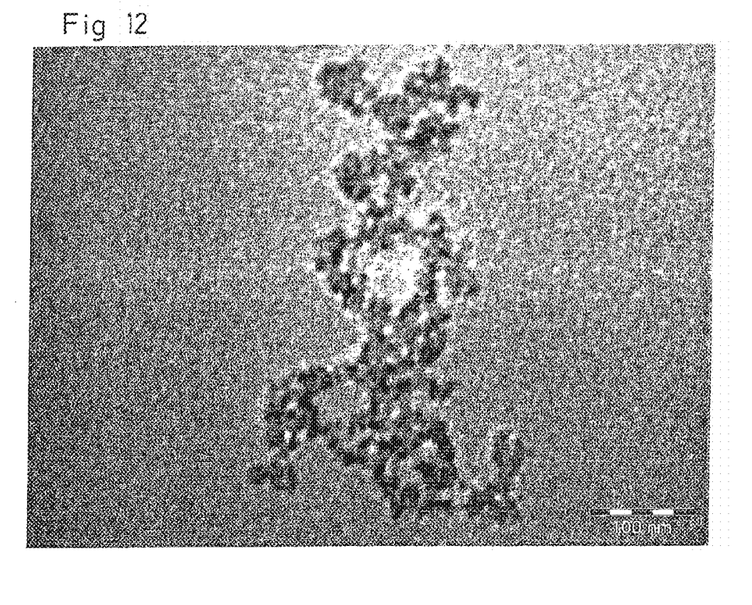
FIG. 12 is a transmission electron microscopy view showing nanocrystals.

FIG. 12 is a transmission electron microscopy view showing the nanocrystals obtained.

Figure 14:
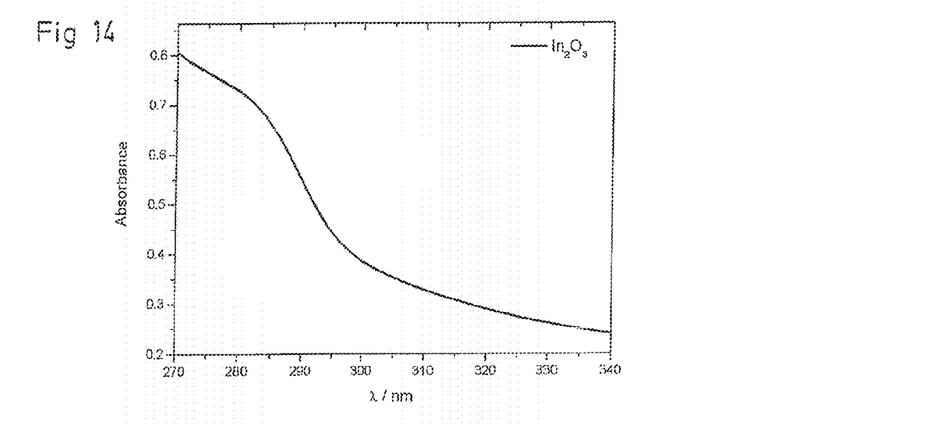
FIG. 14 is an absorption spectrum of the nanocrystals.

The absorption spectrum of the nanocrystals obtained shown in FIG. 14 confirms, like the x-ray analyses carried out, that it is indeed indium oxide $In_2O_3$.

EXAMPLE 15

This example is identical to Example 1, replacing the zinc precursor by 0.021 mol.l$^{-1}$ of Sn(TMSA) and in the presence of 0.021 mol.l$^{-1}$ of the ligand BisAmPEG1500.

The nanocrystals obtained are in the form of entirely spherical (isotropic dimensions) nanoparticles of tin oxide $SnO_2$, the average dimension of which is about 2 nm. They can be dispersed in water to form an aqueous colloidal solution.

Figure 15:
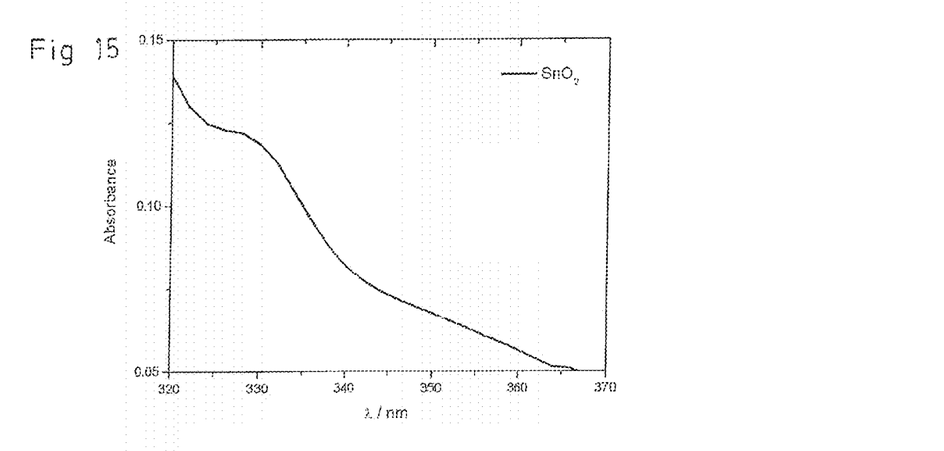
FIG. 15 is an absorption spectrum of the nanocrystals.

The absorption spectrum of the nanocrystals obtained shown in FIG. 15 confirms, like the x-ray analyses carried out, that it is indeed tin oxide $SnO_2$.

EXAMPLE 16

This example is identical to Example 1, replacing the zinc precursor by 0.024 mol.l$^{-1}$ of In(Me)$_3$ and 0.012 mol.l$^{-1}$ of Sn(TMSA) in the presence of 0.036 mol.l$^{-1}$ of the ligand BisAmPEG1500.

The nanocrystals obtained are in the form of entirely spherical nanoparticles (isotropic dimensions) of a mixed oxide of indium and tin, the average dimension of which is about 2 nm. They can be dispersed in water to form an aqueous colloidal solution.

The invention claimed is:

1. A method for the preparation of a composition of nanoparticles of metal oxide nanocrystals, of at least one crystalline metal oxide, the method comprising:
preparing a liquid solution comprising at least one organometallic precursor that is spontaneously reactive to oxidation, in an aprotic solvent medium, in the presence of at least one water soluble organic PEG ligand which has at least one carbon chain, at least one end of which is functionalized by a coordinating group containing at least one hetero atom, and is soluble in said aprotic solvent medium; and
contacting said liquid solution with at least one oxidizing agent for directly forming metal oxide nanocrystals, wherein:
the at least one PEG ligand has the following general formula (I)

wherein:
R$^1$ is chosen from a primary amine group —R$^3$NH$_2$, a carboxyl group —R$^4$COOH, a phosphine group —R$^6$P(Ph)$_2$, Ph representing phenyl, a phosphonate group chosen from —PO(OR$^7$)(OR$^8$), —PO(O$^-$)$_2$ and —PO(O$^-$)(OH); R$^3$, R$^4$, and R$^6$ independently representing a group containing at least one aliphatic chain, R$^7$ and R$^8$ independently being a hydrogen atom or a group containing at least one aliphatic chain;
R$^2$ is chosen from a hydrogen atom, an alkyl group, an unbranched fatty chain, a primary amine group —R$^3$NH$_2$, a carboxyl group —R$^4$COOH, a phosphine group —R⁶P(Ph)₂, Ph representing phenyl, a phosphonate group chosen from —PO(OR⁷)(OR⁸), —PO(O⁻)₂ and —PO(O⁻)(OH); R³, R⁴, and R⁶ independently representing a group containing at least one aliphatic chain, R⁷ and R⁸ independently being a hydrogen atom or a group containing at least one aliphatic chain; and n is an integer greater than or equal to 1;

each PEG ligand is soluble in said aprotic solvent medium, and a water-compatible and organocompatible composition of metal oxide nanocrystals is obtained directly in one stage.

2. The method as claimed in claim 1, wherein each PEG ligand used has an average molecular weight of between 300 g.mol⁻¹ and 20,000 g.mol⁻¹.

3. The method as claimed in claim 1, wherein the at least one PEG ligand is an amino/carboxy-PEG ligand selected from the group consisting of amines and carboxylic acids that contain at least one carbon chain having at least one group [—OCH₂CH₂]ₙ, n being an integer greater than or equal to 1, and are soluble in water.

4. The method as claimed in claim 3, wherein at least one amino/carboxy-PEG ligand is selected from the group consisting of α-amino-poly(ethylene glycol), bis-amino-poly(ethylene glycol), α-carboxy-poly(ethylene glycol), bis-carboxy-poly(ethylene glycol), and α-amino-ω-carboxy-poly(ethylene glycol).

5. The method as claimed in claim 1, wherein at least one PEG ligand is an amino/carboxy-PEG ligand selected from the group consisting of:

bis(3-propylamine)-poly(ethylene glycol) of the formula H₂NC₃H₆[—OCH₂CH₂]ₙ—OC₃H₆NH₂, having a molecular weight of the order of 1,500 g.mol⁻¹, bis(2-ethylamine)-poly(ethylene glycol) of the formula H₂NC₂H₄[—OCH₂CH₂]ₙ—OC₂H₄NH₂, having a molecular weight of the order of 3,000 g.mol⁻¹ to 10,000 g.mol⁻¹, α-(2-ethylamine)-methoxy(ethylene glycol) of the formula H₃C[—OCH₂CH₂]ₙ—OC₂H₄NH₂, having a molecular weight of the order of 750 g.mol⁻¹, poly(ethylene glycol)dicarboxylic acid of the formula HOOC—CH₂[—OCH₂CH₂]ₙ—O—CH₂—COOH, having a molecular weight of the order of 600 g.mol⁻¹, and poly(ethylene glycol) methyl ether-carboxylic acid of the formula H₃C[—OCH₂CH₂]ₙ—O—CH₂—COOH, having a molecular weight of the order of 3,000 g.mol⁻¹.

6. The method as claimed in claim 1, wherein said aprotic solvent medium comprises a solvent selected from the group consisting of THF, toluene, anisole, and methylene chloride.

7. The method as claimed in claim 1, wherein said aprotic solvent medium comprises at least one PEG ligand and at least one volatile liquid compound, said volatile liquid compound being chosen to evaporate progressively with the formation of the nanocrystals, and the nanocrystals are obtained directly in the form of a powder.

8. The method as claimed in claim 1, wherein the production of nanocrystals is carried out under ambient pressure and at a temperature of between 0° C. and 200° C.

9. The method as claimed in claim 1, wherein each PEG ligand used has an average molecular weight of between 500 g/mol and 5,000 g/mol.

10. The method as claimed in claim 1, wherein the production of metal oxide nanocrystals is carried out under ambient pressure and at ambient temperature.

* * * * *